July 23, 1935. H. M. PRYALE 2,009,204

RUNNING BOARD

Filed July 21, 1932 2 Sheets-Sheet 1

INVENTOR
Harry M. Pryale.
BY
Harness, Dickey, Pierce & Hanna.
ATTORNEYS.

July 23, 1935. H. M. PRYALE 2,009,204
RUNNING BOARD
Filed July 21, 1932 2 Sheets-Sheet 2
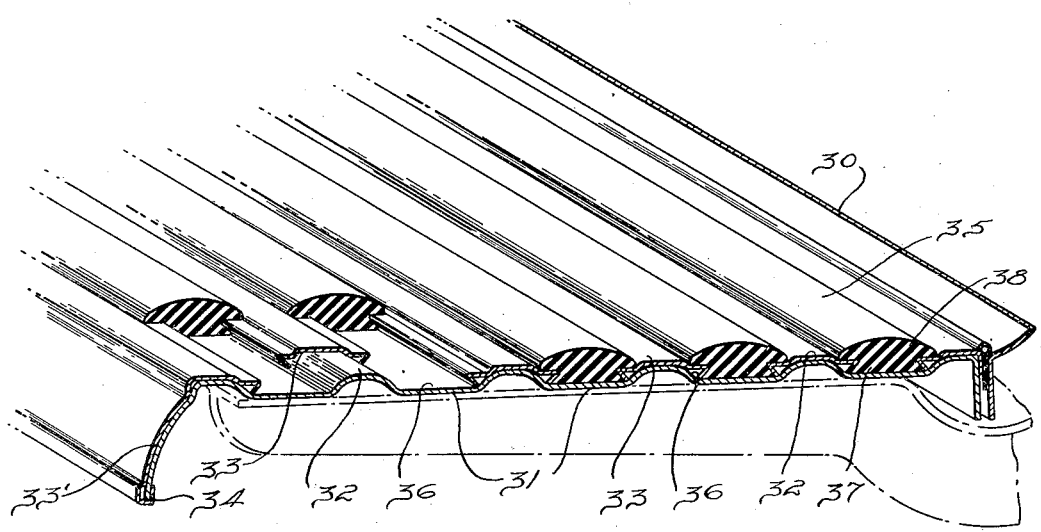
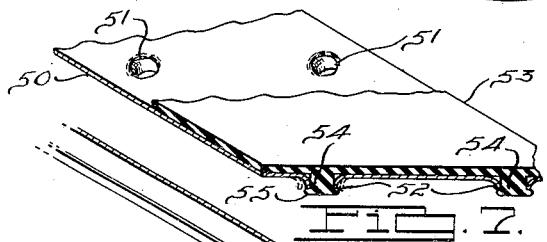
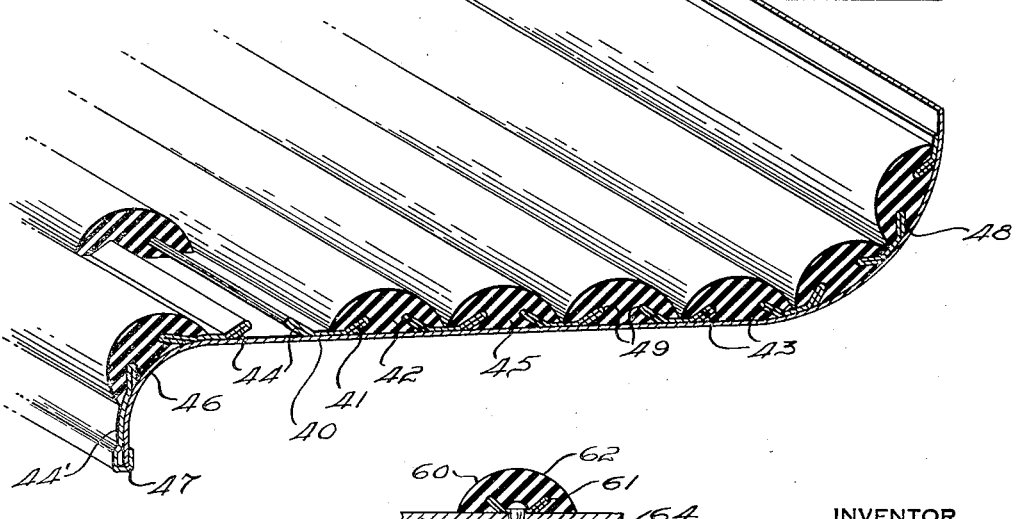
INVENTOR
Harry M. Pryale.
BY
Harness, Dickey, Pierce & Hanno
ATTORNEYS.

Patented July 23, 1935

2,009,204

UNITED STATES PATENT OFFICE 2,009,204

RUNNING BOARD

Harry M. Pryale, Pontiac, Mich.

Application July 21, 1932, Serial No. 623,827

4 Claims. (Cl. 280—163)

This invention relates to running boards and more especially to running boards for automotive vehicles.

An object of the invention is to provide an improved running board construction.

A further object of the invention is to provide a precured rubber tread member including integral means for attaching the same to a running board base.

A further object of the invention is to provide a base member for running boards which is of light weight and which will be reliable and efficient in use.

A further object of the invention is to provide a base member for running boards having portions attached thereto or portions thereof so shaped as to increase the strength and rigidity of the running board in a longitudinal direction and to serve as securing means for attaching tread members thereto.

A further object of the invention is to provide a novel form of tread member adapted to firmly interlock with portions of the above mentioned base member.

A further object of the invention is to provide a running board construction including a base member and tread members securely bonded thereto.

A further object of the invention is to provide a self-sealing union between the base and tread members of a running board construction.

Other objects and advantages will become apparent from the following description and appended claims.

The invention involves the provision of a running board assembly including a base member channeled, or having channel members attached thereto, to strengthen and increase the rigidity thereof, in a longitudinal direction, and to provide securing means for effecting the attachment of tread members adapted to be assembled thereon.

For the purpose of illustrating the genus of the invention, typical concrete embodiments are shown in the accompanying drawings in connection with an automobile vehicle.

Figs. 5, 6 and 7 are views similar to Fig. 2 depicting further embodiments of the invention; and Fig. 8 is a section of a part of a running board base with a tread member, according to a further embodiment of the invention, secured thereto.

Figure 1:
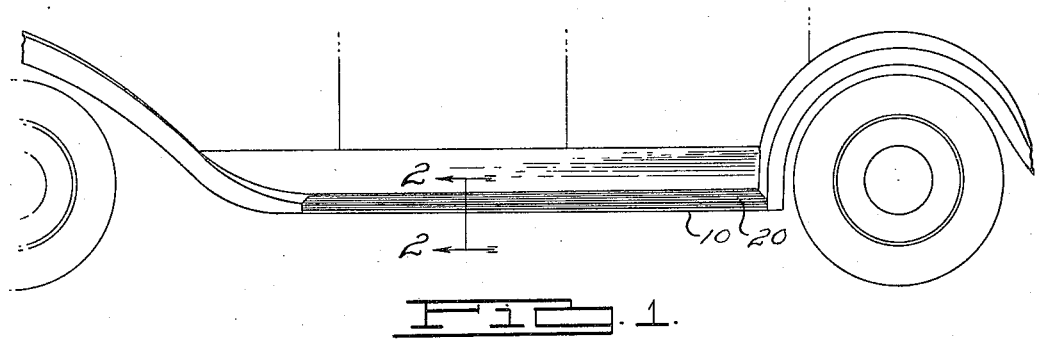
Fig. 1 is a diagrammatic representation of a portion of the side of an automobile and showing a running board assembly constructed according to this invention.
Figure 2:
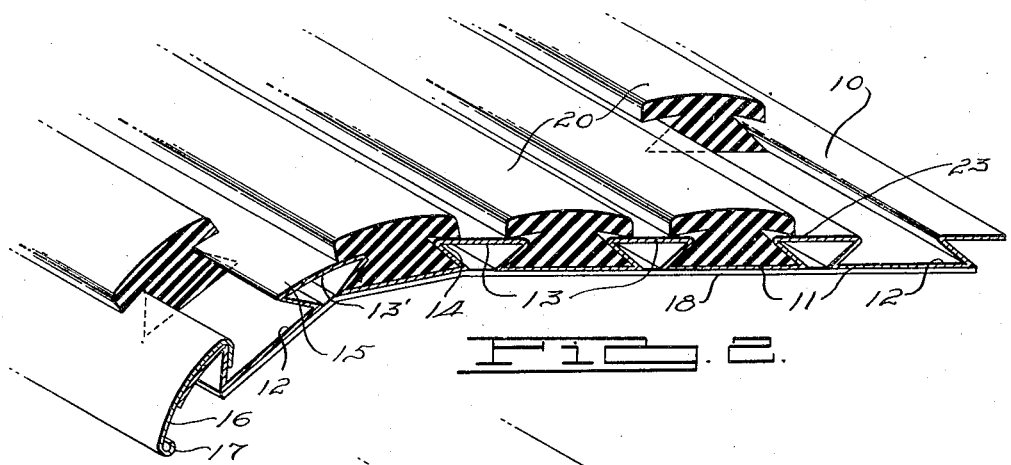
Fig. 2 is an enlarged perspective of a portion of the running board shown in Fig. 1 and showing a section taken on line 2—2 of that figure.
Figure 3:
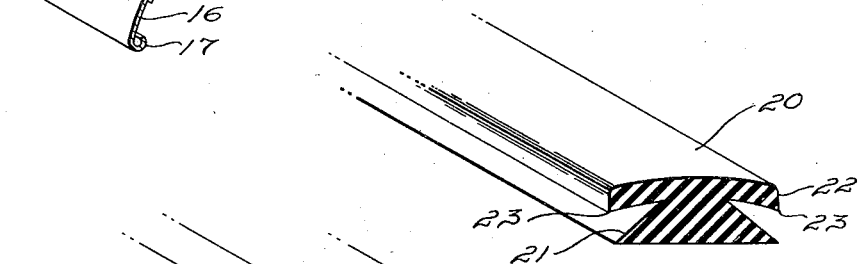
Figs. 3 and 4 are detailed views similar to Fig. 2, on a still more enlarged scale, of a portion of tread and base members, respectively, shown in Figs. 1 and 2.
Figure 4:
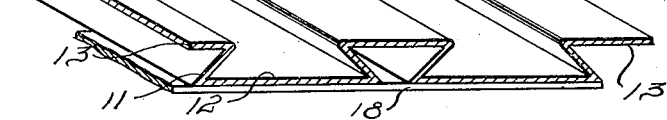

In the fabrication of one type of running board assembly, according to the present invention, a base member 10, of sheet material, and preferably of sheet metal, is shaped as illustrated in Figs. 2 and 4 to form channel portions 11 which provide dovetail channels 12, the channel portions 11 depending from connecting webs 13 forming the top surface of the base member. The major portion of the width of the base member 10 is flat. However, a side portion 15 thereof is bent downwardly to provide the side roll of the running board. In bending the side 15, the bend is made either in a web, as illustrated at 13', or at the corner connecting a web and the adjoining channel portions, as illustrated at 14, so as to preserve the cross-sectional contour of the channel portions in order that all channels may be made of uniform size and shape. The edge strip 16 having a section as illustrated in Fig. 2 may be secured to base member 10, preferably by welding, to provide the rounded marginal edge 17 for the base member 10. It is to be understood, however, that strip 16 may, if desired, constitute an integral part of member 10. Tread members 20, preferably of rubber and comprising dovetail sectioned portions 21, adapted to fit channel portions 11, and partial annular sectioned upper portions 22, adapted to engage the web 13, are secured to the base member 10, by sliding the dovetail portions 21 into the channels 12 while the tread member is tensioned longitudinally and then releasing the tension to allow the dovetail portion to return to its original size and frictionally engage the walls of the channels. The upper portions 22 of tread members 20 are curved downwardly at each side so that the lower edges 23 thereof will biasingly engage the web 13 with sufficient force to effect a seal for preventing admission of water and dirt under said top portion or in the channels 12.

The tread members 20 may be molded or extruded, then vulcanized and then assembled on the running board base. If desired, these members may be bonded to the base member 10 by cementing the dovetail portions to the inner walls of channel portions 11, and to the webs 13 as a further preventative against admission of dirt and moisture between the tread and base members. When the tread members 20 are assembled on the base member 10, the dovetail portions 21 further reinforce the channel portions 11 to increase their strength and rigidity in a longitudinal direction relative to the base member 10. When the running board receives a load, the bottom wall of channel portions 11 and the lower portions of the inclined walls of channels 11 and of the dovetail portions 21 are subjected to tension while the upper portions of the inclined walls, the webs 13 and the upper parts of the dovetail portions 21 are subjected to compression. Due to the provision of channel portions 11 in base member 10 and due to the facts that rubber is substantially incompressible and that the major portion of the rubber composing the dovetail portions 21 is nearly completely confined by channel portions 11, the strength and stiffness of the running board are materially increased so that the base member 10 may be made of much lighter gauge sheet material than could otherwise be employed. Transversely disposed strips 18 may be spot welded or otherwise secured to the bottom surfaces of channel portions intermediate the usual running board supports to increase the rigidity of the running board in a transverse direction.

Referring particularly to Fig. 5 wherein another embodiment of running boards is disclosed, numeral 30 designates a base member provided with downwardly depressed portions 31 extending longitudinally of the base member. Intermediate these depressions, flats 32 are retained and to these flats, strip members 33 are attached, preferably spot welded to the base member 30. This construction provides channels 36 between the marginal edges of the strips 33 and the bottom of the depressions 31. The side edge portions of the strips 33 are downwardly offset and then inturned, as shown in Fig. 5, to bring the channels 36 into dovetail-like formation. The strip members are preferably of sheet material and may be provided with an enamel, stainless steel, or other corrosion resisting and finishing surface. The outer marginal strip 33' may be bent to conform with the base member 30 to provide the outer roll of the running board and the marginal edge is beaded, as indicated at 34.

Tread members 35 comprising dovetail sectioned base portions 37 and mushroom-like sectioned upper portions 38, are slid endwise relative to the base member with the dovetail portions 37 disposed in the channels 36. Tread members 35 may be fabricated as in the previous embodiment and may be bonded to the bottom of depressions 31, to the inturned flanges 39, and to the top side margin of the strips 33 by cementing, as before. The base member is stiffened longitudinally by the corrugated formation thereof, by the channel-like strips 33, and by the tread members, the dovetail portions 37 thereof being nearly completely confined by the bottoms of depressed portions 31 and inturned flanges 39.

Referring to Fig. 6 wherein a still further embodiment of the invention is disclosed, numeral 40 designates an essentially flat base member having shallow U-shaped channel strips 41 spot welded or otherwise secured thereto. These strips are longitudinally disposed relative to the base member in spaced parallel arrangement and the flanges 44 thereof are reversely bent upon themselves to provide a curved margin 49 to prevent their cutting the tread portion since the upper part thereof is unconfined and therefore displaceable. Segmental-like sectioned tread members 42 are provided with slots 43 extending inwardly and upwardly from their margins and shaped to receive the side flanges 44 of the channel strips 41. The tread members 42 are attached to the base member by sliding them endwise with the flanges 44 disposed in slots 43. The tread members may be constructed as in the previously described embodiment and may be bonded to the base member 40 and channel strips 41 by cementing, as before. It is noted that tread members 42 are thus provided with dovetail section portions 45 which are nearly wholly confined by the flanges 44 and base member 40. These dovetail portions and the channel strips 41 stiffen the base member in the same manner as in the first-described embodiment.

The side portion 46 of the base member 40 may be curved downwardly to provide the side wall of the running board and the outer channel strip 44' curved to conform to the curvature of the base member at the side portion thereof. A bead 47 may be formed at the marginal edge of strip 44'. At the inner edge of the running board the base member may be directed upwardly, as indicated at 48, to provide a kick plate portion.

Referring particularly to Fig. 7 of the drawings, a base member 50 having punched openings 51, is disclosed. These openings are formed, as by punching, so as to leave a downwardly projecting annular flange 52 about the openings. A mat-like tread member 53 is provided with integral bosses 54 projecting from the lower surfaces thereof, and these bosses are in turn provided with enlargements on heads 55. This tread member is constructed in the form indicated, then vulcanized, and then assembled on the base member by pressing bosses 54 through the openings 51 and locked in position by crimping the metal forming the annular flanges 52. In this manner a preformed and precured tread member or mat is easily attached to a running board base. The tread member may be cemented to the base member, if desired.

In Figure 8 a still further embodiment of running board construction is illustrated. In this construction individual tread members 60 are formed by embedding a sheet metal channel-sectioned strip 61, similar to strip 41 of Fig. 6, in a segmental-like sectioned rubber members 62 and after curing the rubber to its final form, the tread member is ready to be fastened to a running board base. As illustrated, fastening means in the form of brads 63 are attached to the sheet metal securing strip 61, whereby the tread member may be attached by driving the brads into a base 64 of wood or other material which will retain the brads. It is to be understood that the tread member may be fastened by other means as for example, when it is desired to secure this type of tread member to a metal base member the sheet metal securing strip 61 could be attached to a metal base by spot welding or small threaded bolts could be substituted for the brads and the tread members fastened to a base by bolt and nut connections. Also, if desired, the fastening means such as that disclosed relative to Fig. 7 could be employed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. In a running board assembly, a base member formed of sheet material and shaped to provide channel portions, web members connecting said channel portions, individual tread members of an elastic material comprising base portions shaped to fit said channel portions to secure said tread and base members in assembled relation and upper portions having downwardly directed side margins adapted to biasingly engage said web members for effecting a seal therebetwen.

2. In a running board assembly, a base member formed of sheet material, channel sectional strip members secured to said base member in spaced longitudinal relation to provide channels between said strip members and base member, individual tread members of an elastic material having base portions adapted for disposal in said channels for securing said tread members to said base member, said tread member having top portions provided with downwardly directed margins adapted to biasingly engage said strip members for effecting seals between the tread and strip members.

3. The method of constructing a running board assembly which consists in shaping a base member so as to provide spaced channels extending longitudinally thereof, shaping rubber tread members so as to provide integral portions adapted to tightly fit said channels, vulcanizing said rubber tread members, tensioning said tread members so as to reduce the cross sectional area of said integral portions and introducing said integral portions in said channels while the tread members are tensioned, and releasing the tension on said tread members.

4. In the construction of a running board assembly, the method of fastening a rubber tread member to a base which consists in forming spaced channels extending longitudinally of said base, forming portions of said tread members so as to tightly fit said channels, vulcanizing said tread members, tensioning and introducing said portions in said channels while under tension, and releasing the tension exerted on said portions to cause said portions to frictionally engage the walls of said channels.

HARRY M. PRYALE.